(12) United States Patent
Beaver et al.

(10) Patent No.: US 8,281,389 B2
(45) Date of Patent: Oct. 2, 2012

(54) SYSTEM AND METHOD FOR TAMPER EVIDENT CERTIFICATION

(75) Inventors: Donald Rozinak Beaver, Pittsburgh, PA (US); Robert Harwell Thibadeau, Pittsburgh, PA (US); Laszlo Hars, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 1280 days.

(21) Appl. No.: 11/643,629

(22) Filed: Dec. 21, 2006
(Under 37 CFR 1.47)

(65) Prior Publication Data
US 2008/0155262 A1 Jun. 26, 2008

(51) Int. Cl.
*G06F 21/00* (2006.01)
(52) U.S. Cl. .................. 726/18; 726/1; 726/19; 726/22; 726/30; 380/277; 380/286; 713/168; 713/171; 713/180; 713/185; 713/189
(58) Field of Classification Search .................. 380/286, 380/277; 713/168, 171, 180, 185, 189; 726/1, 726/22, 18, 19, 26, 30
See application file for complete search history.

(56) References Cited

U.S. PATENT DOCUMENTS

| | | | |
|---|---|---|---|
| 5,263,147 A | 11/1993 | Francisco et al. | 395/425 |
| 5,454,157 A | 10/1995 | Ananth et al. | 29/603 |
| 6,470,449 B1 | 10/2002 | Blandford | 713/178 |
| 6,609,199 B1 | 8/2003 | DeTreville | 713/172 |
| 6,658,568 B1 | 12/2003 | Ginter et al. | 713/193 |
| 6,775,779 B1 | 8/2004 | England et al. | 713/200 |
| 6,782,349 B2 | 8/2004 | Challener et al. | 702/186 |
| 6,871,278 B1* | 3/2005 | Sciupac | 713/185 |
| 2002/0026576 A1 | 2/2002 | Das-Purkayastha et al. | 713/156 |
| 2002/0141594 A1 | 10/2002 | MacKenzie et al. | 380/286 |
| 2005/0132202 A1* | 6/2005 | Dillaway et al. | 713/179 |
| 2007/0266443 A1* | 11/2007 | Wilson et al. | 726/27 |
| 2009/0070596 A1* | 3/2009 | Mantin et al. | 713/189 |

OTHER PUBLICATIONS

Johan Hastad et al., "Funkspiel Schemes: An Alternative to Conventional Tamper Resistance", conference on Computer and Communications Security, Proceedings of the 7th ACM conference on Computer and Communications security, pp. 125-133, 2000.*
K. Seamons et al.; "Requirements for Policy Languages for Trust Negotiations," Proceedings of the Third Int'l Workshop on Policies for Distributed Systems and Networks, 2002, 1-12.
Winslett, M. and Yu, T.; "Negotiating Trust on the Web," IEEE Internet Computing, Nov.-Dec. 2002, pp. 30-37.
K. Seamons et al.; "TrustBuilder: Negotiating Trust in Dynamic Coalitions," Proceedings of the DARPA Information Survivability and Exposition, 2003, pp. 1-3.
E. Bertino et al.; "x-TNL: An XML-based Language for Trust Negotiations," Proceedings of the 4th Int'l Workshop on Policies and Distributed Systems and Networks, 2003, pp. 1-4.

(Continued)

*Primary Examiner* — Jeffrey Pwu
*Assistant Examiner* — Hee Song
(74) *Attorney, Agent, or Firm* — Cesari & Reed, LLP; Kirk A. Cesari

(57) ABSTRACT

A storage device has a storage medium, a set of credentials stored on the storage medium, and a controller. The controller within the storage device is coupled to the storage medium, and adapted to identify security status of the storage device. The controller is adapted to alter one or more credentials of the set of credentials responsive to the security status.

16 Claims, 7 Drawing Sheets

OTHER PUBLICATIONS

Winsborough, W. and Jacobs, J.; "Automated Trust Negotiation Technology with Attribute-based Access Control," Proceedings on the DARPA Information Survivability Conference and Exposition, 2003, pp. 1-3.

G. Shaw et al.; "Digital Document Integrity," IEEE The Institution of Electrical Engineers, 2000, pp. 12/1-12/4.

R.J. Hayton et al.; "Access Control in an Open Distributed Environment," pp. 1-12.

Yu, T. and Winslett, M.; "A Unified Scheme for Resource Protection in Automated Trust Negotiation," Proceedings of the 2003 IEEE Symposium on Security and Privacy, pp. 1-13.

W. Winsborough et al.; "Automated Trust Negotiation," pp. 1-15, prior to Jan. 2007.

K. Seamons et al.; "Trust Negotiation in Dynamic Coalitions," Proceedings of the DARPA Information Survivability Conference and Exposition, 2003, pp. 1-6.

L. Kagal et al.; "Trust-Based Security in Pervasive Computing Environments," *Computer*, Dec. 2001, pp. 154-157.

M. Greenberg et al.; "Mobile Agents and Security," *IEEE Communications Magazine*, Jul. 1998, pp. 76-85.

Hughes, et al.; "Dynamic Trust-based Resource Allocation", Proceedings of the DARPA Info. Survivability Conference and Exposition (DISCEX'03), 2003, 1 page.

M. Blaze et al.; "Decentralized Trust Management," IEEE Transactions 1996, pp. 164-173.

U. Maurer.; "New Approaches to Digital Evidence," Proceedings of the IEEE, vol. 92, No. 6, Jun. 2004, pp. 933-947.

Winsborough, W. and Li, N.; "Safety in Automated Trust Negotiation," Proceedings of the IEEE 2004 Symposium on Security and Privacy, 2004, pp. 1-14.

S. Stubblebine.; "Recent-Secure Authentication: Enforcing Revocation in Distributed Systems," IEEE Transactions 1995, pp. 224-235.

H. Skogsrud et al.; "Model-Driven Trust Negotiation for Web Services," IEEE Internet Computing, Nov.-Dec. 2003, pp. 45-52.

D. Vawdrey et al.; "Trust Negotiation for Authentication and Authorization in Healthcare Information Systems," Proceedings of the 25th Annual Int'l Conference of the IEEE EMBS, Sep. 2003, pp. 1406-1409.

N. Li et al.; "Design of a Role-Based Trust-Management Framework," Proceedings of the 2002 IEEE Symposium on Security and Privacy, 2002, pp. 1-17.

H, Dwoskin et al.; "Scoping Security Issues for Interactive Grids," IEEE Transactions, 2003, pp. 367-373.

K, Bussard et al.; "Untraceable Secret Credentials: Trust Establishment with Privacy," Proceedings of the Second IEEE Annual Conference on Pervasive Computing and Communications Workshops, 2004, pp. 1-5.

Eyers, D. and Moody, K.; "Credential Negotiation with Limited Disclosure Via Iterative Range Refinement in an Unordered Space," Proceedings of the 14th Int'l Workshop on Database and Expert Systems Applications, 2003, pp. 1-5.

Bakkali, H. and Kaitouni, B.; "A Logic-Based Reasoning about PKI Trust Model," IEEE Transactions, 2001, pp. 42-48.

V. Ungureanu.; "A Regulated Approach to Certificate Management," Paper from Rutgers University, pp. 1-9, prior to Jan. 2007.

Winsborough, W. and Li, N.; "Towards Practical Automated Trust Negotiation," Proceedings of the Third Int'l Workshop on Policies for Distributed Systems and Networks, 2002, pp. 1-12.

H. Wang et al.; "Achieving Secure and Flexible M-Services Through Tickets," IEEE Transactions on Systems, Man, and Cybernetics—Part A: Systems and Humans, vol. 33, No. 6, Nov. 2003, pp. 697-708.

A. Choudhri et al.; "PatientService: Electronic Patient Record Redaction and Delivery in Pervasive Environments," IEEE Transactions 2003, pp. 41-47.

Balopoulos, T. and Gritzalis, S.; "Towards a Logic of Privacy-Preserving Selective Disclosure Credential Protocols," Proceedings of the 14th Int'l Workshop on Database and Expert Systems Applications, 2003, pp. 1-6.

V. Welch et al.; "Security for Grid Services," Proceedings of the 12th Int'l Symposium on High Performance Distributed Computing, 2002, pp. 1-10.

Mont, M. and Yearworth, M.; "Negotiated Revealing of Traders' Credentials in e-Marketplaces: Dealing with Trust and Privacy Issues," Hewlett-Packard Laboratories, United Kingdom, pp. 1-6, prior to Jan. 2007.

E. Freudenthal et al.; "dRBAC: Distributed Role-based Access Control for Dynamic Coalition Environments," Proceedings of the 22nd Int'l Conf. On Distributed Computing Systems, 2002, pp. 1-10.

* cited by examiner

| PURPOSE | PUBLIC | PRIVATE | CERTIFICATE |
|---|---|---|---|
| CONVINCE VALID | PuKnormal | PrKnormal | Cert_normal |
| TAMPER EVIDENCE | PuKtamper | PrKtamper | Cert_tamper |

FIG. 2

SYSTEM AND METHOD FOR TAMPER EVIDENT CERTIFICATION

CROSS-REFERENCE TO RELATED APPLICATION

None.

FIELD OF THE INVENTION

The present invention relates to systems that make use of and methods of using certificates in a public key infrastructure, and more particularly, to systems and methods for detecting tampering using such certificates.

BACKGROUND OF THE INVENTION

Generally, computer security refers to measures taken to protect against some unwanted occurrence, such as the invasion of privacy, theft, and the corruption of information stored on the computer. Security techniques such as encryption, passwords, and firewalls are designed to prevent unauthorized access to information, to protect the integrity of computing resources, and to limit the potential damage that can be caused by attackers and intruders.

Encryption refers to a process by which information is transformed into an unreadable form, which cannot readily be deciphered without a secret key. Encryption is widely used to protect information in many different situations. For example, most Internet browsers for surfing the Internet include encryption algorithms for processing commercial transactions, where the browser encodes data into a form that is unreadable without the appropriate key before transmitting the encoded data over the Internet.

One type of encryption that may be used to secure transmitted data is referred to as public key encryption (also referred to as asymmetric encryption). Public key encryption (PKE) is a form of encryption that equips each user with two keys: a private key and a public key. Both the private and public keys can be provided by a trusted third-party known as a certificate authority (CA). One example of a trusted third-party that serves as a certificate authority is Verisign, Inc. of Mountain View, Calif., which issues digital certificates that can be used to create public-private key pairs.

The public key for each intended recipient is known by everyone with access to the key registry maintained by the certificate authority and is used to encrypt messages sent to an intended recipient. The private key, which is known only to the intended recipient, can be used to decrypt the message. The public key and private key are linked in a manner such that only the public key can be used to encrypt messages to a particular recipient, and only the private key held by that recipient can be used to decrypt the messages. As long as the private key holder maintains the secrecy of the private key, security of data transmitted between the sender and the intended recipient can be maintained, meaning that the risk of eavesdropping (compromising the privacy of information in transit), tampering (changing or replacing information in transit), impersonating (posing as the intended recipient), and spoofing (impersonating the sender) can be minimized.

A public key infrastructure (PKI) is a means by which public keys can be managed on a secure basis for use by widely distributed users or systems. Public key infrastructures typically include defined data formats, infrastructure components (such as security administrators, certificate authorities, users, and the like), and procedures for the distribution of public keys via digital certificates signed by a certificate authority. In a public key infrastructure (PKI), entities such as users or devices are issued digitally signed certificates, which can attest to the binding between the name of the user and a public key for which the user holds the corresponding private key. The certificates are typically in a standardized form, such as that dictated by standard x.509.

Once a certificate is issued to a user, the user (or device) can use the certificate as a form of proof by which the user can establish a trust relationship with a relying party (e.g. a web server, a network server, a storage device, another computing device, and the like). For example, a trust relationship can enable one device to access secured resources on the other device.

Generally, a relying party is a computer, a device, or other system that includes secured resources, which the user is attempting to access. The term "relying party" refers to the system that must render a trust decision with respect to the certificate or other convincing information. The relying party challenges the user's access request, and in response to the challenge, the user provides the certificate it received from the certificate authority (CA). The relying party inspects the certificate, verifies that the CA's signature on the certificate is correct, and tests an applicant's identity by requesting a proof of some sort that the applicant knows the private key corresponding to the public key identified in the certificate.

An identity certificate generally indicates the name of the user or device, the public key, and acceptable uses for the public key. Typically, the public key may be used for non-repudiation, authentication, and/or encryption. Additionally, the public key may be used for digital signatures. An authority certificate indicates what sorts of operations the user is authorized to perform. As used herein, the holder of a certificate (identity or authority) may be referred to as the "certificate holder," the "applicant", the "user" or the "entity."

Conventionally, a relying party forms a full access or no access decision based on the certificate. Either the applicant is the named entity and holds the appropriate authorization, or not. Unfortunately, this presents a difficulty when the applicant may be operating or may have been operated under adverse circumstances. For example, the applicant could be represented by software whose integrity may have been compromised, for example by a computer virus. Or, for example, the applicant's private key may in fact have been obtained in an unauthorized fashion, such as by eavesdropping. Conventionally, it is difficult to contain the potential damage when such tampering or compromising has occurred.

One suggested approach is to destroy the certificate when the certificate holder enters into a state where tampering might occur. This method has the drawback that certificates are intended to be potentially public, and may well have been disclosed in numerous prior interactions as a basis for establishing trust relationships. Prior usage of the certificate increases the risk that the certificate may be available to an adversary. Normally, such exposure is not a major concern, per se, because the certificate itself is considered "public" and cannot be altered. However, a drawback lies in assuming that the certificate is no longer available when the entity destroys the certificate. An adversary, such as a computer hacker, may restore or make use of the certificate at a point in which a computer system coupled to the storage device enters into a higher risk setting. Alternatively, an adversary, for example, may obtain the private key for the certificate, thereby obviating the entity's precautions.

A further drawback of this and related destructive methods is that the destruction may be irreversible. When an entity returns to a safe zone (such as, for example, the device manufacturer's service center) or an acceptably safe state (such as, for example, when a storage device is reformatted and the operating system software is reinstalled from CDs or other means), it may be desirable to restore the entity's ability to convince a relying party of its trustworthiness. In other words, it may be desirable for the entity to be allowed to prove that it is not tampered or otherwise compromised. Extensive destructive methods can make certificate restoration virtually impossible.

Unfortunately, conventional security measures are typically external to the storage device of the computer, and often exist as applications that operate within an operating system environment of the computer or of another computer connected over a network. Such security measures can be vulnerable to viruses and to attacks on the operating system. Moreover, such applications may be incapable of detecting when the integrity of a storage device has been compromised. In particular, if a virus infects the operating system in which the security application is operating, the security application may be incapable of detecting the virus. Moreover, if the storage device is removed from the computer, the security application can be circumvented. If the security application manages certificates and keys, the protected information may be exposed.

Therefore, there is a need for systems and methods for detecting when an entity may be exposed to a potentially compromising situation. Embodiments of the present invention provide solutions to these and other problems, and offer other advantages over the prior art.

SUMMARY OF THE INVENTION

A storage device has a storage medium, a set of credentials stored on the storage medium, and a controller. The controller within the storage device is coupled to the storage medium, and adapted to identify an increased vulnerability of the storage device. The controller is adapted and to alter one or more credentials of the set of credentials responsive to the identified increased vulnerability. Thus, the credentials are used to provide an indication of how secure the device is.

In one embodiment, a storage device has a storage medium, convincing evidence stored on the storage medium, a security policy, and a controller. The security policy defines procedures for managing the convincing evidence. The controller is disposed within the storage device, coupled to the storage medium, and adapted to manage the convincing evidence, such as credentials according to the security policy.

In another embodiment, a method for tamper evident certification of a storage device is described. A controller of the storage device monitors a storage medium of the storage device for one or more state changes indicative of possible tampering or increased vulnerability of the storage device. The controller alters convincing evidence stored on the storage medium if one or more state changes are identified.

Other features and benefits that characterize embodiments of the present invention will be apparent upon reading the following detailed description and review of the associated drawings.

BRIEF DESCRIPTION OF THE DRAWINGS

FIG. 2 is a simplified table illustrating a tamper evident certificate annotation.

DETAILED DESCRIPTION OF ILLUSTRATIVE EMBODIMENTS

The following disclosure is related to systems and methods for managing certificates within a storage device and for providing a tamper evident certification if a controller within the storage device learns or decides that the storage device may have been exposed to tampering. The tamper evident certification provides a means by which a relying party, based on a tamper evident certificate, can make a decision that falls between full access and no access (such as partial access). In other words, a relying party can make an informed decision with respect to an access request, and may choose to enter into a trust relationship, or a relationship that is less than a fully trusted relationship, with a potentially tampered device. For example, a tamper evident certificate may lead a relying party to allow "guest" access to a requesting device, rather than permit full access to resources.

Figure 1:
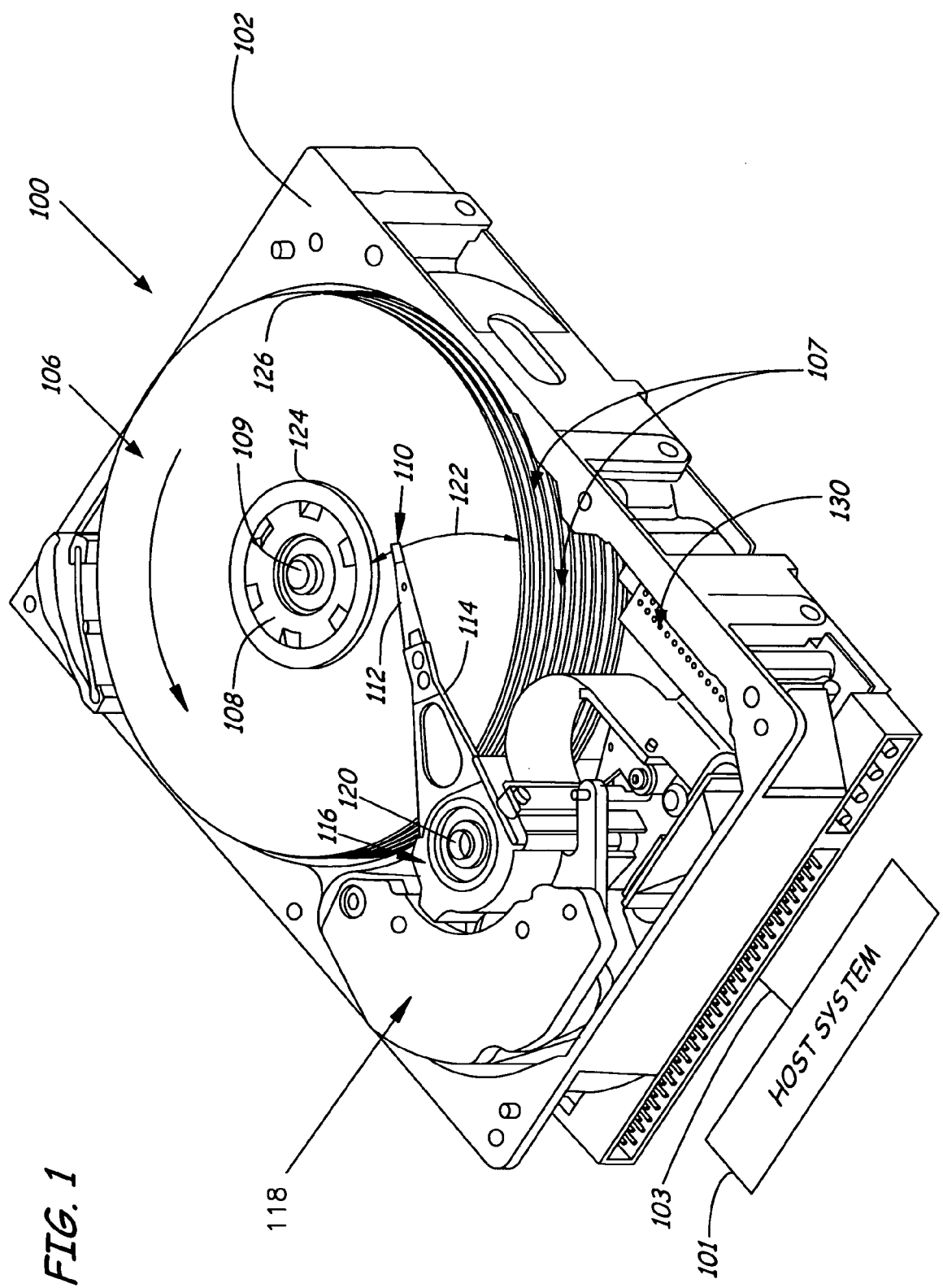
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 which is coupled to disc drive 100 for communication with the disc surface.

In the example shown in FIG. 1, the disc head sliders 10 are supported by suspensions 112, which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached track accessing arms 114 about a pivot shaft 120 to position read/write heads disposed on disc head sliders 110 over desired data tracks along arcuate path 122 between disc inner diameter 124 and a disc outer diameter 126. Voice coil motor 118 is driven by electronics 130 based on signals generated by read/write heads on sliders 110 and a host system 101 coupled to the disc drive 100 by interface 103. The host system 101 can be a computer or another device coupled by interface 103 to the disc drive 100. The electronics 130 typically includes servo electronics for positioning sliders 110 as well as a controller and associated firmware for reading and writing data to and from the discs 107 via the heads disposed on sliders 110.

In one embodiment, the systems and methods of the present invention utilize a public-private key pair and an associated certificate (convincing evidence) to provide proof to a relying party of the trustworthiness of the device, specifically for the purpose of establishing a "trust relationship". The controller of the storage device (e.g. electronics 130 of the disc drive 100) is preferably adapted to monitor the state of the storage device (or the state of one or more files stored on a storage medium, such as digital files stored on discs 107, of the storage device) relative to a predefined set of security policies. The controller of the storage device is preferably adapted to alter or modify at least a portion of the convincing evidence if an increased vulnerability is detected based on the predefined set of security policies. The term "vulnerability" refers to any number of circumstances defined by the security policies that may compromise the integrity of the storage device, including changes to storage device settings, changes to files stored on the storage medium of the storage device, and so on.

It should be understood that an operating system for a host system 101 (such as a computer operating system) may be stored on the disc drive 100 and loaded into memory on start up of the host system 101. In such an instance, changes to operating system files stored on the discs 107 may represent a change of state indicating a state of vulnerability or compromise. Consequently, attempts to change and/or changes to the operating system files stored on the discs 107, which can be detected by the controller within the storage device, may be listed in the predefined set of security policies. The security policies can also include procedures or actions to be taken by the controller within the storage device in the event of such an attempt. For example, the security policies can indicate that a change to certain operating system files is indicative of potential tampering, and provide instructions to the controller of the storage device to alter a portion of the convincing evidence in order to prevent the establishment of a trust relationship until the storage device is re-certified and/or verified by a trusted entity. Alternatively, the controller within the storage device can be adapted to take preventive steps in advance of any such changes. It should be understood that the controller is a mechanism disposed within the storage device 100, for example, which can be implemented as circuitry or as a processor adapted to implement computer readable instructions or as a software application operating on a processor within the device electronics.

Thus, when an entity, such as the disc drive 100, is in an initially safe or untampered state (such as when the entity is purchased from the manufacturer, when the entity is verified by its manufacturer or authorized agent, and so on), a controller within the entity can make determinations regarding future trust relationships. In other words, the controller of the entity can determine whether it should prevent relying parties from depending on the disc drive's integrity at a later time. For example, in situations where debugging is about to occur or when a software version is to be changed or updated, the controller within the disc drive can make a determination in advance that the future integrity of the disc drive should not necessarily be relied upon. Actions such as debugging or updating software can cause a break in continuity in the judged integrity of the system relative to the initially known, safe state. While the break in continuity does not necessarily imply that tampering has in fact occurred, the break in continuity should be indicated to a relying party so that the relying party can render informed policy decisions.

As used herein, the term "trust relationship" refers to an established, authenticated link between two devices that guarantees both devices will operate as expected with a level of predictability that is acceptable to the relying device. In one embodiment, the trust relationship is a link between two domains (such as two networks, two servers, any two devices on a network, and so on) that enables one domain to trust the other domain for authentication. For example, a trust relationship enables a first device to access resources, such as programs and information, on a second device. The party (or device) requesting access provides evidence guaranteeing a certain level of predictability in terms of operation in order to establish the trust relationship. For example, a trust relationship with a storage device entails an expectation that the storage device will behave as the manufacturer of the device intended.

According to an embodiment of the present invention, when a controller within a storage device learns or decides that it may be exposed to tampering, the controller follows defined security policies to prevent the storage device from convincing a relying party that tampering can be ruled out. In one embodiment, prior to allowing a potentially-compromising event to proceed, the controller within the storage device takes precautionary steps toward disabling or otherwise inhibiting access to certificate-type "convincing" information (or convincing evidence), so that the convincing information is altered or disabled for subsequent establishment of trust relationships. By altering or disabling such "convincing" information, the controller provides indicia to a relying party that tampering may have occurred, in part, because the storage device is no longer able to engage in a convincing demonstration of continuous integrity. In other words, the actions taken by the controller within the storage device based on the security policy enables a relying party to make informed trust-related decisions if the storage device has been exposed or potentially (not necessarily) tampered, due to a change in state or condition.

It will be understood by workers skilled in the art that the present invention can be applied to any device that supplies convincing evidence for the purpose of facilitating policy-based decision-making by a relying party. In general, the present invention is applicable to any type of storage device including a disc drive (such as that shown in FIG. 1), EEPROM, MRAM, flash memory, or any other computing or communication device that supplies such "convincing" information. The systems and methods of the present invention may be applied to any storage device or communication device having a controller adapted to evaluate a vulnerability of the device and to take action with respect to authentication credentials based on the evaluated vulnerability.

It should also be understood that the entity may be a user, a device, or any other target agent that holds a certification. In general, the terms "entity", "user", "device", "applicant", and "cert-holder" refer to a target agent whose integrity is in question. In one setting, the entity is a disc drive (such as that shown in FIG. 1) with suitable firmware (and hardware) that is isolated from a host client, meaning that the firmware and hardware reside on the drive. Updating or modifying the firmware, using debug/test backdoors, or various other software and hardware changes may constitute grounds for choosing to indicate that tampering has occurred. A "relying party" is the party who forms a belief as to continuity of integrity of the entity. A "restoration agent", as used herein, is an agent that engages in restoring the entity to a state accepted as valid (untampered). A "backup agent" or "escrow agent", as used herein, is an agent that maintains redundant information to enable reconstitution of the convincing evidence or certificate of the entity in case of a loss of data by the entity itself.

In some instances, an entity may possess a plurality of certificates. In one embodiment, the present invention utilizes sets of certificates indicative of normal and tampered states. Thus, the credential provides an indication of the state or status of security of the device. For example, the credential can indicate the device is secure or that something has occurred with the device to bring its security into question. FIG. 2, for example, illustrates a table of public and private key pairs for providing convincing evidence or tamper evidence. In one embodiment, the entity possesses a plurality of certificate sets, wherein each certificate set is formed from two certificates. One certificate of the certificate set has an annotation indicating "normal" or "untampered". The other certificate of the set includes an annotation indicating "tampered".

Each certificate contains a different public key from the named entity. These keys can be called public key normal (PuKnormal), which can be annotated "untampered" or "normal". Each certificate may also contain a public key (PuKtamper), which is annotated "tamper" or "tampered". The annotation may be explicit or implicit, may be asserted by a different certificate authority, and/or explicitly annotated in only one case. The purpose of these public keys (and their associated private keys) is to provide convincing evidence that the entity can be trusted, or that the entity should not necessarily be trusted (possible tampering may have occurred).

It should be noted that the term "tamper" indicates evidence or indicia of potential tampering, but not necessarily actual tampering. Conversely, the term "untampered" indicates that there is no evidence of tampering that has been observed, which is different from asserting that no tampering has occurred.

When an device is in an initial, assumed safe state, the device holds the private keys for both the normal and tamper keys. The normal and tamper keys contain information about the storage device that is sufficient to establish a trust relationship (e.g. a fully authenticated trust relationship). These keys may be called PrKnormal and PrKtamper.

If a controller within the device detects tampering or a situation indicative of increased vulnerability to the possibility of tampering, the controller within the device can take precautionary steps to reduce its ability to convince a relying party of its trustworthiness. Specifically, the controller of the storage device can delete the convincing evidence, copy the convincing evidence to a secure escrow agent or backup agent and then delete the convincing evidence, or alter the convincing evidence in some way so as to make the convincing evidence less than fully effective to create a trust relationship. In one embodiment, the controller removes or deletes the PrKnormal key together with its associated certificate. The device is then left with the PrKtamper key and its associated certificate Cert_tamper. The PrKtamper key and tamper certificate (Cert_tamper) are similar to the PrKnormal key and Cert_normal certificate, respectively; however, the PrKtamper key and Cert_tamper certificate preferably contain insufficient information for the device to fully establish a trust-relationship with a relying party. Thus, the tamper key provides the relying party with an indication that some tampering may have occurred, and the relying party can make a policy decision accordingly. In some instances, a relying party may grant some level of access to a potentially tampered device based on the PrKtamper key. Thus, the precautionary steps do not necessarily remove all credentials from the device, but rather remove some of the indicia used to prove trustworthiness in order to cause a relying party to make appropriate policy decisions.

These key pairs provide a means for making trust-based policy decisions to relate to the entity in a way that falls in between a fully-trusted relationship and a no-trust relationship. In other words, the systems and methods of the present invention allow for trust levels between full access and no access wherein relying parties can use the information gleaned from the tamper credentials of the device to establish an appropriate level of trust.

Figure 3:
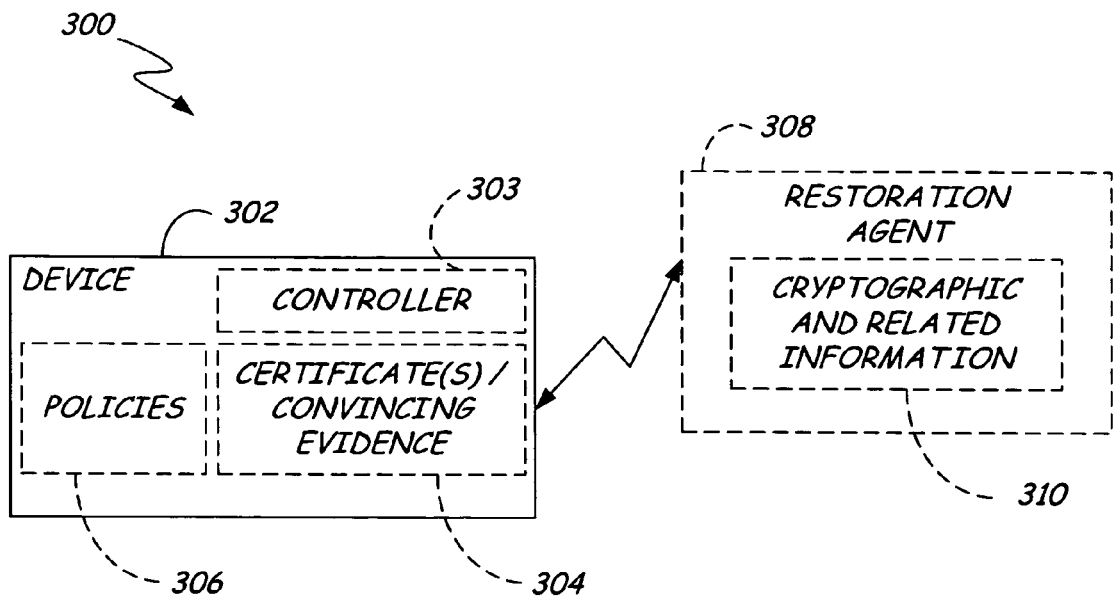
FIG. 3 is a simplified block diagram of a storage device in communication with a restoration agent according to an embodiment of the present invention.

FIG. 3 illustrates a simplified block diagram of a system 300 with the capability of reversing tamper evidence according to an embodiment of the present invention. The system 300 includes a device 302 with a controller 303, which maintains policies 304 identifying problematic state changes and follows procedures for handling such state changes with respect to one or more certificate(s) and/or convincing evidence 306. The policies 304 can include state changes related to enabling debugging inspection or revisions to software code. A plurality of such state changes can be listed. Each such state change can be associated with a desired precaution or action to be taken by the controller 303 of the device 302. Such precautions preferably include reversible tamper evidence (RTE), irreversible tamper evidence (ITE), or other similar indications. Additional independently specified precautions might include full external backup, no full external backup, and the like.

The ability to "reverse" tamper evidence can be provided through interaction with, for example, a restoration agent (escrow agent) 308, which holds cryptographic and related information 310 to enable reversal of the alteration or deletion of the certificates and/or convincing evidence 304. The restoration agent 308 can exist on a remote device, on a storage media (such as a restoration CD), on a hidden and/or tightly controlled memory location in the device 302, or in any other location. Preferably, the restoration agent 308 is communicatively accessible for verifying the authenticity of the device 302 to restore the certificate(s) and/or convincing evidence 304 when the device 302 is verified to be "untampered". The restoration agent 308 can be invoked, for example, if the device 302 has been restored or revived in an assumed safe setting such as a factory or warranty center or a corporation's IT department. Conditions for such reversal may also be established in a policy 306 that applies to the restoration agent 308. Such a policy-based condition can be evaluated by the restoration agent 308 in light of the available history of the device 302 during its potential exposure before making a final determination with respect to potential tampering.

When an device 302 determines that it will enter one of the predefined policy-based state changes, or if it detects that one of the changes has occurred (for example, if a system file has been altered), it then engages in a transformation to indicate tamper evidence. The transformation can thus occur prior to any exposure to tampering (where entering into risk of exposure may be an authorized action), for the purpose of constraining future potential tampering. Additionally, the transformation can occur after detection of possible exposure to tampering, including instances where unauthorized steps may have led to risk of exposure.

In general, the transformation causes the device to be unable to satisfy a relying party that it can be trusted by rendering the device unable to prove it holds the private key (PrKnormal). The relying party shall then conclude at best that the device is in a "tampered" state (meaning that the device is potentially tampered). The device should still need to answer the "tampered" certificate challenges, or the relying party will reject the certificate and the requesting party out of hand.

For example, in one instance, the device 302 is a disc drive with a controller 303 coupled by an interface to a computer system (such as an ATA or SCSI interface between a processor and the disc drive within a standard computer system). The user of the computer system installs a program that modifies the operating system of the computer system (which is stored on the storage medium of the disc drive). If one of the state changes defined in policies 306 relates to one or more of the modified operating system files, the controller 303 within the disc drive alters or deletes the certificate(s) and/or convincing evidence 304. In one embodiment, the controller 303 performs an operation defined in the policies 306.

Subsequently, the user accesses a network device with the computer, and when the network device requests the certificate(s) and/or convincing evidence to establish a trust relationship, the computer is able to provide only the tamper certificate and/or convincing evidence that is less than what is required for establishing the trust relationship. The network device can then refuse the connection, allow restricted access, or permit full access, depending on the network's security protocols.

In a second embodiment, the controller 303 within the disc drive is adapted first to copy the certificate(s) and/or convincing evidence 306 to a trusted escrow agent or restoration agent 308, for example, through a virtual private network connection or other secure tunnel connection through the computer over a network. If the network connection is unavailable, the controller 303 may be adapted to delete or alter the certificate and/or convincing evidence 306. If the network connection is available, the controller 303 of the device 302 moves the certificates and/or convincing evidence 306 to the restoration agent 308. Then, the controller 303 deletes the certificate and/or convincing evidence 306 from the device 302.

Subsequently, the device 302 is unable to provide convincing evidence to a relying party or device. To restore the certificate(s) and convincing evidence 306, the state of the device 302 can be verified, revised or restored by a trusted party, such as the manufacturer, a corporate information technology department, or another trusted service department. Once the state is verified as safe, the restoration agent 308 can be accessed by the controller 303, which provides indicia that the state of the device 302 has been verified as safe. The restoration agent 308 evaluates the indicia to determine whether to restore the certificate(s) and convincing evidence 306, and if the indicia are sufficient, the restoration agent 308 restores the certificate(s) and convincing evidence 306 to the device 302. In one embodiment, the controller 303 is triggered to request restoration of the convincing evidence 306 based on resetting of a flag or other parameter in the device 302 by the trusted verifying party.

Figure 4:
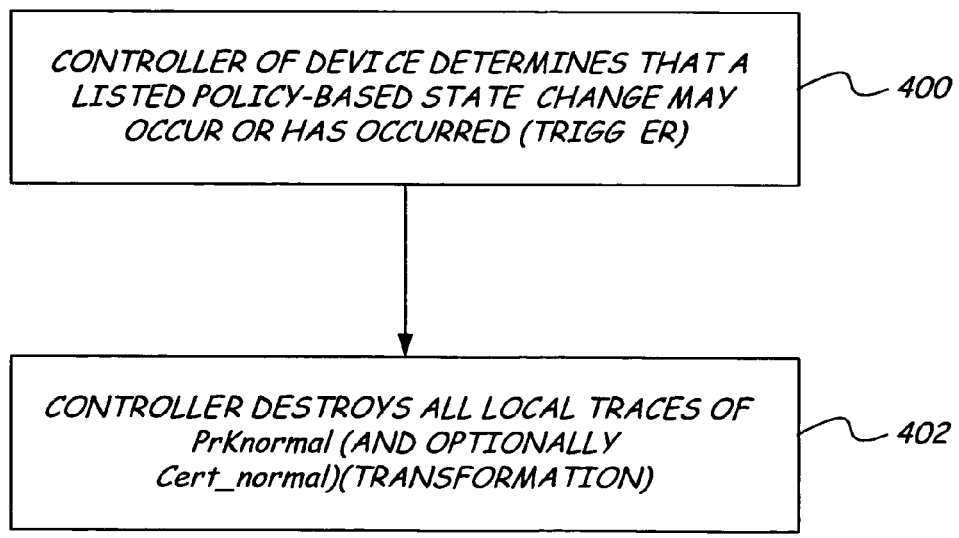
FIG. 4 is a simplified flow diagram of an irreversible tamper evident process for indicating a change of state in the device.

FIG. 4 illustrates a simplified flow diagram of a transformation process used to handle irreversible tamper evidence. First, the controller within the device determines that it will enter one of the states identified in the policy for state changes or that one of the listed policy-based state changes has occurred (block 400). This step may be conceptualized as a "trigger". Once, the policy-based state change or the possibility of such a change has been determined (triggered), based on the predetermined policies, the controller of the device destroys all local traces of PrKnormal (optionally Cert_normal) (block 402). In one embodiment, the transformation consists of destroying (erasing) the PrKnormal key. Optionally, the certificate may be destroyed as well.

As previously indicated, the destruction of the PrKnormal key and/or the certificate is difficult if not impossible to reverse, because all traces of the key have been destroyed on the local device. Unless the erasure failed, the evidence of the key cannot be recovered.

It should be understood that the PrKtamper key and its associated certificate (Cert_tamper) may remain after deletion of the PrKnormal key, thereby allowing the device to maintain some credentials. The PrKtamper credentials are useful; however, it may be that a field in the Cert_tamper certificate associated with the PrKtamper key provides less than the information needed to completely authenticate the device. In this instance, the relying party can make a trust-related decision based on the available information. In layman's terms, this might be the equivalent of proving an individual's identity using a student ID card as opposed to a state issued driver's license, for example. In some instances, this lower level of identification may be acceptable, while in others it may be insufficient.

FIGS. 5A through 6B illustrate simplified flow diagrams of a method of handling reversible tamper evidence. In one embodiment, the transformation consists of providing PrKnormal key to a restoration agent to hold in escrow, after which the PrKnormal key is destroyed by the controller of the device. The restoration agent is adapted to reverse the tamper evidence (e.g. restore the convincing evidence) by re-installing the PrKnormal key in the device. An advantage of this method is that full restoration may be possible (with the restoration agent or other agents having maintained backup information). Preferably, the escrow or backup of the certificate(s) and/or convincing evidence occurs in an initial phase, and the transformation step then consists solely of destroying the PrKnormal key.

Figure 5A:
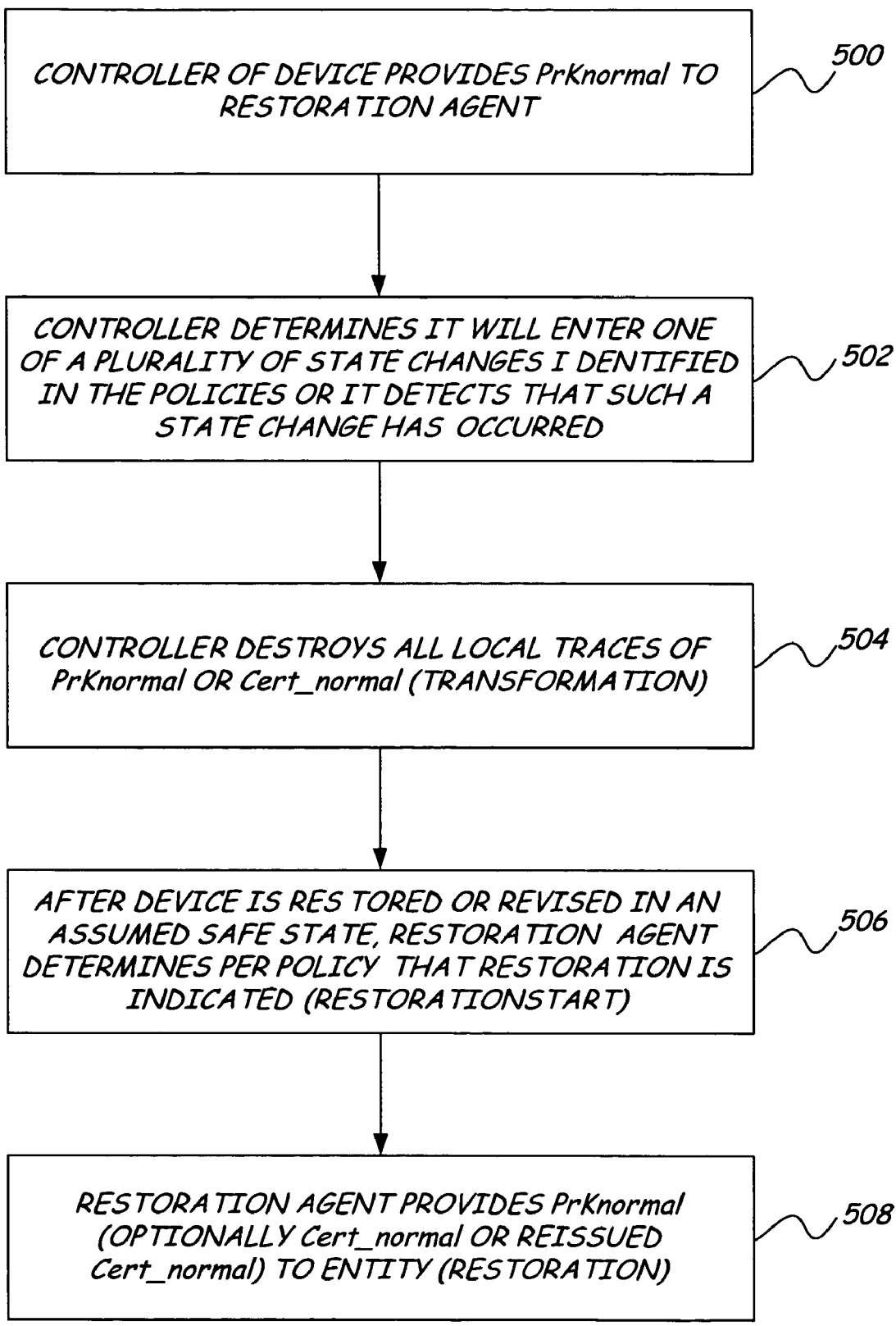
FIGS. 5A and 5B illustrate a simplified flow diagram of a process for providing reversible tamper evidence according to an embodiment of the present invention.

FIG. 5A illustrates a simplified flow diagram of a reversible tamper evident transformation according to one embodiment of the present invention. A controller within the device provides PrKnormal to a restoration agent (block 500). This step may be conceptualized as an escrow process. The controller within the device determines that it will enter one of a plurality of state changes identified by the policies or it detects that such a state change has occurred (block 502). This step may be considered a trigger step. Because of the detection and according to the policy, the device (via the controller, for example) destroys all local traces of PrKnormal and/or Cert_normal (block 504). This may be thought of as a transformation step. It should be understood that the particular order of blocks 500 and 502 may be reversed, such that detection (block 502) occurs before the convincing evidence is provided to the restoration or escrow agent (block 500).

As previously discussed, the ability to "reverse" the indication of tampering is provided via the restoration agent, which holds cryptographic and related information to enable such reversal. If the device has been restored or revised in an assumed-safe setting such as a factory, a warranty center, a corporation's IT department, and the like, the controller within the device may initiate restoration of the convincing evidence. The restoration agent determines based on restoration policies that restoration is indicated and should be performed (block 506). This may be thought of as a restoration start or begin step. The restoration agent then provides PrKnormal and/or optionally a Cert_normal (or a re-issued Cert_normal) to the device (block 508). This may be thought of as a restoration step. Thus, the device's inability to satisfy a relying party that it holds the PrKnormal key provides indicia that tampering may have occurred. Once the device is returned to a safe state and the restoration agent restores the PrKnormal key (and optionally Cert_normal), the device can use the PrKnormal (and optionally Cert_normal) to satisfy a relying party in order to establish a full trust relationship.

For example, a user inserts an operating system update CD in the CD ROM drive of a computer. The user launches the update program on the CD. The update program loads into the random access memory of the computer, and attempts to access the operating system program files stored on the hard disc of the computer. In this instance, a copy of the convincing evidence has already been uploaded to a restoration server, which may be a hidden partition on the storage device or which may be a remote server connected via a network connection. The controller temporarily intercepts the access commands and scripts of the update program (which are received over the interface), alters the certificate and/or convincing evidence, then allows the update process to continue.

Figure 5B:
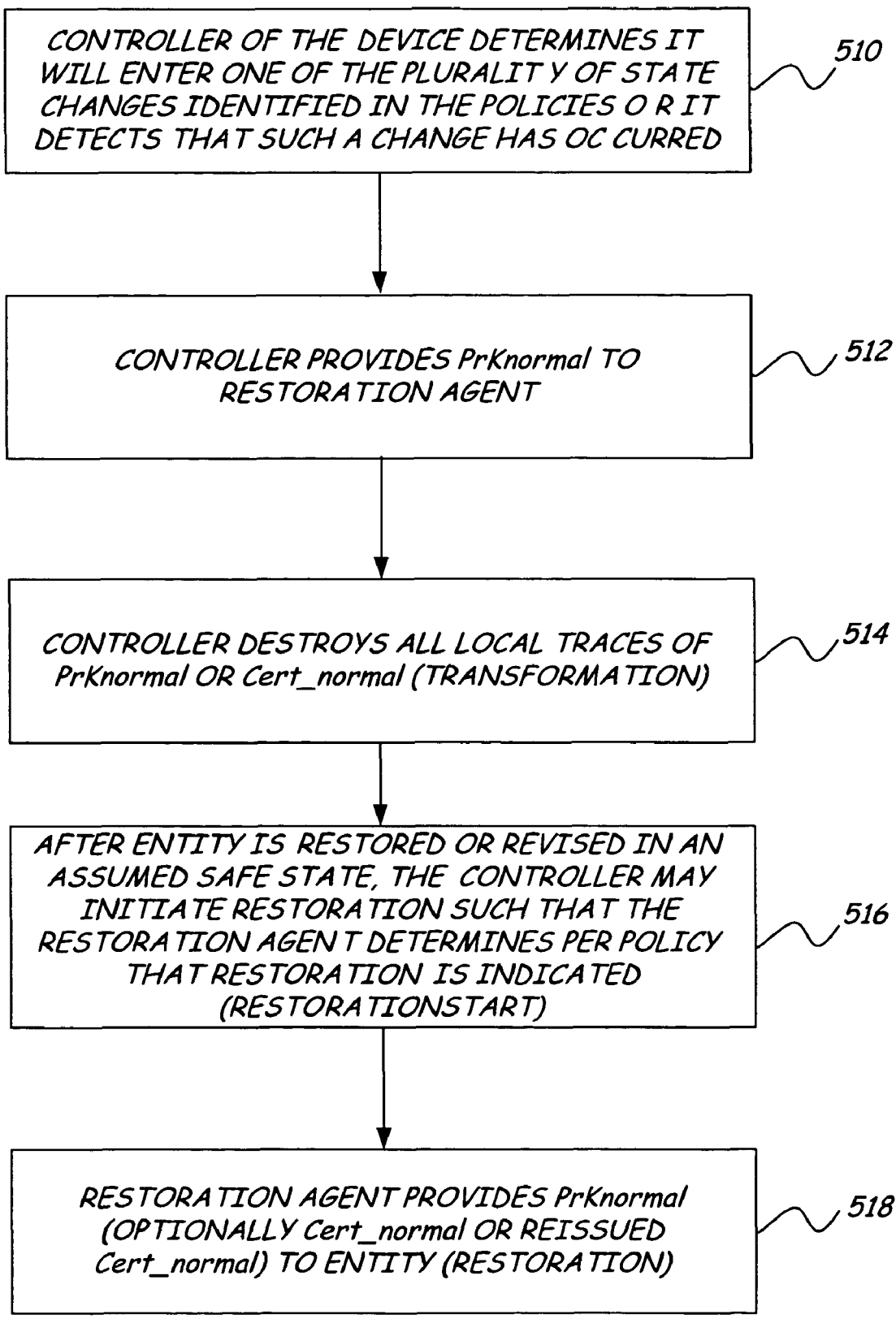

FIG. 5B illustrates a variation of the flow process of FIG. 5A wherein the escrow and trigger steps are reversed. As shown in FIG. 5B, the controller within the device determines that it will enter one of a plurality of state changes identified by the policies or it detects that such a state change has occurred (block 510). The controller of the device provides PrKnormal to the restoration agent (block 512). The controller then destroys all local traces of PrKnormal and/or Cert_normal (block 514). Once the restoration agent determines per policy that restoration is indicated (block 516), the restoration agent then provides PrKnormal and/or optionally Cert_normal or re-issued Cert_normal to the device (block 518).

In one embodiment, the controller within the device alters the PrKnormal key by encrypting it with a symmetric or asymmetric encryption key. The unencrypted PrKnormal key and the encryption key are then deleted, and the decryption key is provided to the restoration agent. The encrypted version of the PrKnormal key is stored within the device along with the decryption key DK. The decryption key DK is held by the Restoration agent. In this embodiment, the tamper-evident transformation consists of destroying the decryption key DK. The Restoration agent can then reverse the tamper evidence by providing the decryption key DK to the restored/repaired/safely-environed device.

One advantage of this method is that the Restoration Agent need not be trusted with knowledge of the PrKnormal key, and its duty to approve and enable restoration is kept separate from the actual convincing evidence of the device itself. Maintaining backup information for a full restoration (PrKnormal excluded) in case of a complete compromise of the device can be performed by agents other than the Restoration agent. Thus, the backup and restoration process for the device can be maintained separately from the key restoration process performed by the Restoration agent. Arguably, this technique is more secure than providing the certificate and/or convincing evidence to the restoration agent directly, because the certificate and convincing evidence are not exposed outside of the device.

One example of the process described in FIG. 5B is a computer system having a hard disc with electronic circuitry, including a controller adapted to provide such hardened security features. In this instance, if a program or a user attempts to update files on the disc drive that are identified in the security policies, the controller within the circuitry of the hard disc intercepts the command received from the interface, establishes a secure connection with a restoration agent (such as a remote computer connected over a network), copies the convincing evidence to the restoration agent, alters the convincing evidence on the disc drive, and then allows the intercepted command to proceed. Alternatively, instead of copying the convincing evidence to the restoration agent, the controller within the circuitry of the hard disc can encrypt the convincing evidence, copy a decryption key to the restoration agent, and then delete the unencrypted convincing evidence and the decryption key from the disc drive.

Figure 6A:
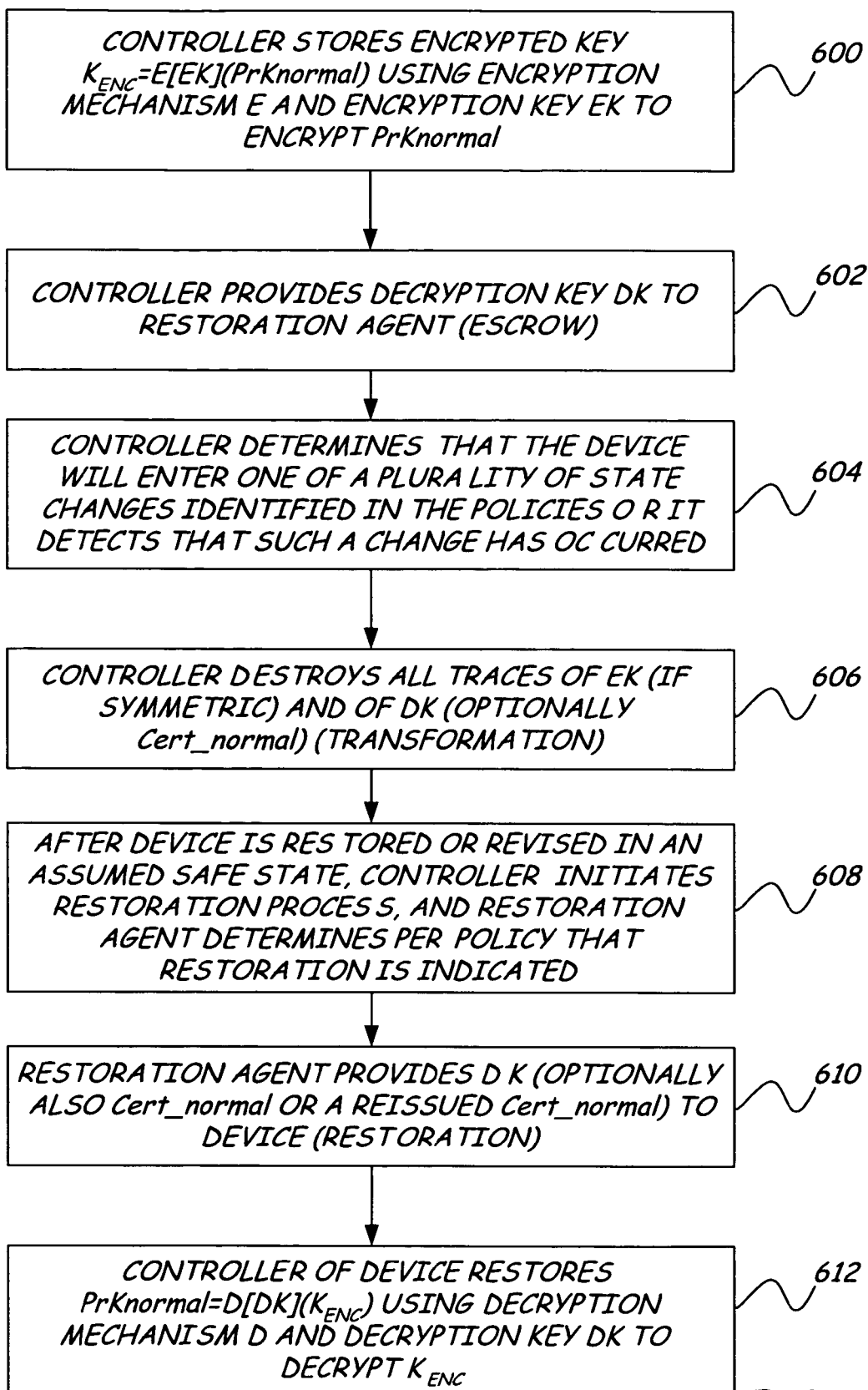
FIGS. 6A and 6B illustrate a simplified flow diagram of a technique for providing reversible tamper evidence where a decryption key is stored in escrow according to an alternative embodiment of the present invention.
Figure 6B:
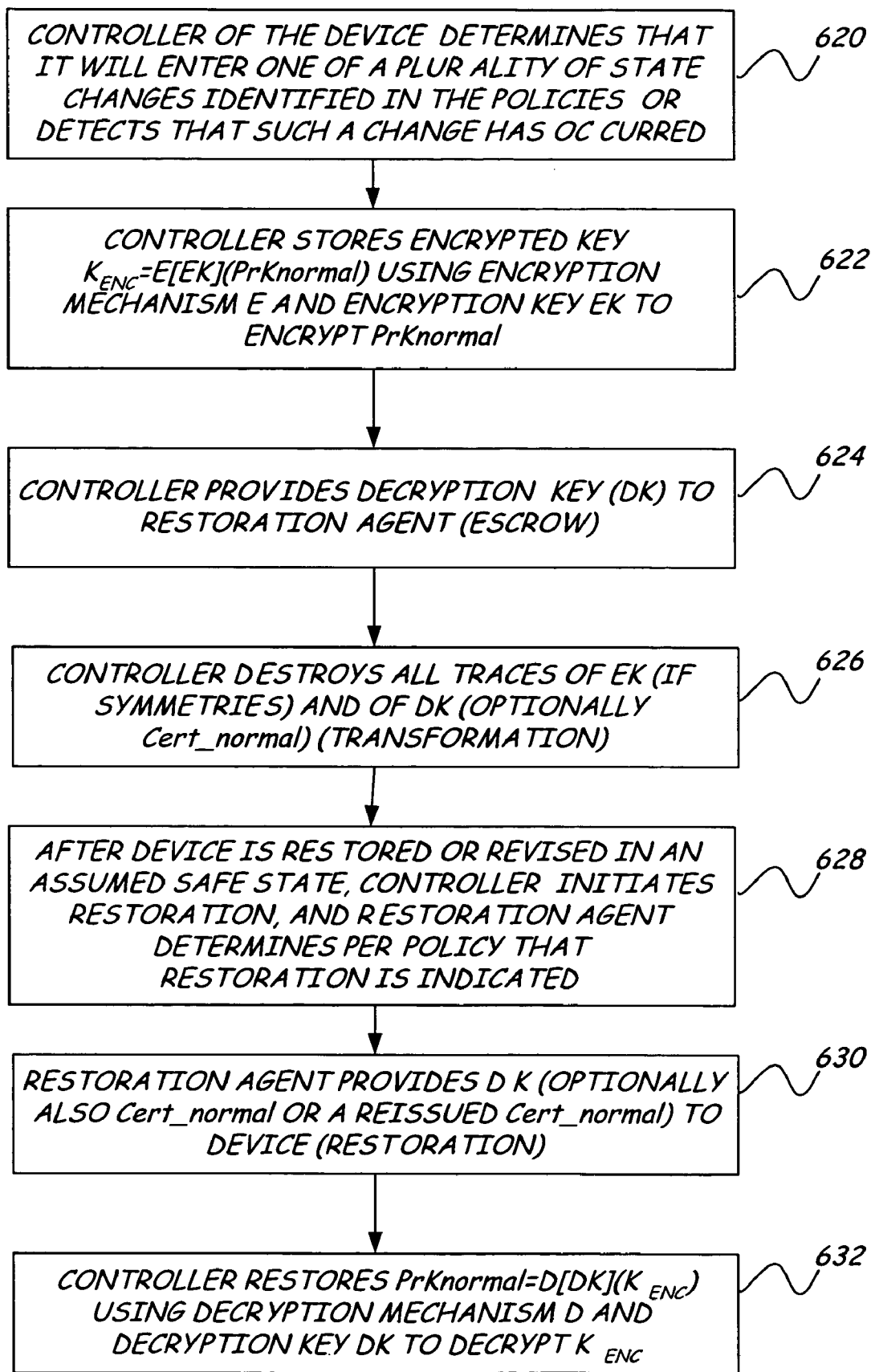

FIGS. 6A and 6B are simplified flow diagrams illustrating the encrypted method according to embodiments of the present invention. In the following discussion, the encryption key (EK) and the decryption key (DK) may not necessarily be distinct, such as for example if the encryption key (EK) is a symmetric key.

The device stores encrypted key ($K_{enc}$) using encryption mechanism (E) and encryption key (EK) to encrypt PrKnormal (block 600). The device provides the Decryption key (DK) to a restoration agent (block 602). This step is sometimes referred to as an "escrow" step and the "restoration agent" may be considered an "escrow agent". The device determines that it will enter one of the policy-based state changes or it detects that such a change has occurred (block 604). This step may be referred to as a "trigger" step. Once the trigger step is implicated, the device destroys all traces of the decryption key (DK) (and of the encryption key (EK) if the key is symmetric) and optionally of the certificate (Cert_normal) (block 606). This step may be referred to as the "transformation" step. Once the key is destroyed (block 606), the device can no longer prove possession of PrKnormal and thus tamper evidence is indicated.

Once the device is restored or revised in an assumed safe state (such as at the manufacturer, in a warranty department, in a corporate IT department, and the like), a restoration agent determines per policy that restoration is indicated (block 608). The restoration agent provides the decryption key (DK) (optionally also Cert_normal or a reissued Cert_normal) to the device (block 610). This may be referred to as a restoration step. Finally, the device restores PrKnormal using a decryption mechanism (D) and decryption key (DK) to decrypt the encrypted key ($K_{enc}$) (block 612).

For example, a controller within the device intercepts a command from the interface that would affect one or more of the files listed in the security policy. The controller alters the convincing evidence according to the security policy. At a later time, the operating system and files stored on the disc drive can be verified by a trusted system (such as a corporate IT department, the disc drive manufacturer, and so on). If the disc drive is verified, the convincing evidence is restored by the restoration agent. Once restoration is complete, the disc drive has the convincing evidence, and the computer associated with the disc drive can once again establish a trust relationship with another system.

In FIG. 6B, the trigger step occurs before the escrow step. The device determines that it will enter one of the policy-based state changes or it detects that such a change has occurred (block 620). This step may be referred to as a "trigger" step. Once the trigger step is implicated, the device stores encrypted key ($K_{enc}$) using encryption mechanism (E) and encryption key (EK) to encrypt PrKnormal (block 622). The device provides the Decryption key (DK) to a restoration agent (block 624). This step is sometimes referred to as an "escrow" step and the "restoration agent" may be considered an "escrow agent". Once the Decryption key (DK) is provided to the restoration agent, the device destroys all traces of the decryption key (DK) (and of the encryption key (EK) if the key is symmetric) and optionally of the certificate (Cert_normal) (block 626). This step may be referred to as the "transformation" step. Once the key is destroyed (block 626), the device can no longer prove possession of PrKnormal and thus tamper evidence is indicated.

Once the device is restored or revised in an assumed safe state (such as at the manufacturer, in a warranty department, in a corporate IT department, and the like), a restoration agent determines per policy that restoration is indicated (block 628). The restoration agent provides the decryption key (DK) (optionally also Cert_normal or a reissued Cert_normal) to the device (block 630). This may be referred to as a restoration step. Finally, the device restores PrKnormal using a decryption mechanism (D) and decryption key (DK) to decrypt the encrypted key ($K_{enc}$) (block 632).

Though the above examples have largely been described with respect to a computer, it should be understood that the systems and methods of the present invention may be applied to any storage device, which stores convincing evidence for establishing trust relationships. For example, digital phones, personal digital assistants (PDAs), or handheld devices adapted to communicate with networks and/or other devices. Additionally, the present invention is applicable to any device having a memory that stores files, which should not be altered by anyone other than a manufacturer or other authorized service center for the device. The technique may be used to flag events where unauthorized software or hardware may have been installed which may compromise built-in security of the device, if, for example, a hardware installation is listed in the security policies.

The present invention provides a number of advantages over conventional security measures. One such advantage is that by managing the certificates within the drive, the drive itself can prevent establishment of a trust relationship. If, for example, the storage device is removed from a computer, the controller can detect that the storage device potentially has been compromised, and can take protective measures to prevent the establishment of a trust relationship.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage subsystem while maintaining substantially the same functionality without departing from the scope and spirit of the present invention. In addition, although the preferred embodiment described herein is directed to a storage subsystem adapted to provide indicia of tampering based on policy-based state changes, it will be appreciated by those skilled in the art that the teachings of the present invention can be applied to any system that utilizes a key or certificate for forming trusted relationships, without departing from the scope and spirit of the present invention.

What is claimed is:

1. A storage device comprising:
   a storage medium; and
   a controller that communicates with the storage medium,
   wherein the controller maintains permission for access to the storage device including the storage medium by a relying party upon a change in a security status of the storage device by altering a trustworthiness of the storage device from a first trust level to a lower second trust level and allowing the relying party to determine whether to access the storage device at the lower second trust level; and
   wherein the controller alters the one or more credentials by deleting, encrypting or removing the credential to prevent formation of a full trust relationship between the storage device and another device, thereby lowering the trustworthiness of the storage device.

2. The storage device of claim 1 further comprising:
   a security policy on the storage medium identifying one or more state changes indicative of increased vulnerability to tampering, wherein the controller determines the increased vulnerability based on the security policy.

3. The storage device of claim 2 wherein the security policy further comprises:
   procedures for managing a set of credentials indicative of security of the storage device responsive to identified state changes, wherein the controller alters a credential of the set of credentials according to the procedures.

4. The storage device of claim 2 further comprising:
   a restoration agent adapted to store one or more credentials of the set of credentials and to restore the one or more credentials to the storage device upon verification that the storage device is in a known, untampered state.

5. The storage device of claim 4 wherein the restoration agent comprises a server coupled to the storage device via a secure network connection.

6. The storage device of claim 1 wherein unaltered credentials of the set of credentials allow formation of a partial trust relationship between the storage device and another device.

7. The storage device of claim 1 wherein a security of the storage device is related to a change or possible change to one or more files stored on the storage medium of the storage device.

8. A storage device comprising:
   a storage medium;
   a security policy on the storage medium defining procedures for managing convincing evidence indicative of security status of the storage device, the security policy including a set of state changes associated with the storage device and files stored on the storage device corresponding to potential increased vulnerability of the storage device to tampering; and
   a controller adapted to manage the convincing evidence according to the security policy,
   wherein the controller maintains permission for access to the storage device by a relying party upon a change in the security status of the data storage device by altering a trustworthiness of the storage device from a first trust level to a lower second trust level and allowing the relying party to determine whether to access the storage device at the lower second trust level.

9. The storage device of claim 8 wherein the set of state changes comprises software revisions, software updates, software installation, script installation, and debug inspection enablement.

10. The storage device of claim 8 wherein the convincing evidence comprises:
    credentials for establishing a trust relationship between the storage device and a second device.

11. The storage device of claim 8 and further comprising:
    a restoration agent adapted to restore convincing evidence based on escrowed information when the storage device is revised or restored to a known untampered state in a trusted environment.

12. A storage device comprising:
    a storage medium;
    a security policy on the storage medium defining procedures for managing convincing evidence indicative of security status of the storage device;
    a controller adapted to manage the convincing evidence according to the security policy,
    wherein the controller is adapted to:
       maintain permission for access to the storage device by a relying party upon a change in the security status of the data storage device by altering a trustworthiness of the storage device from a first trust level to a lower second trust level and allowing the relying party to determine whether to access the storage device at the lower second trust level; and
       alter at least a portion of the convincing evidence responsive to a determination of a potential increased vulnerability of the storage device, thereby lowering the trustworthiness of the storage device.

13. The system of claim 12 wherein unaltered credentials of the set of credentials allow formation of a partial trust relationship between the storage device and another device.

14. A method comprising:
monitoring the storage device for a state change indicative of security status of the storage device;
altering convincing evidence if a state change is identified to lower a trustworthiness of the storage device from a first trust level to a lower second trust level, wherein the altering includes deleting, via a controller, a private key of the convincing evidence such that the private key is unavailable for establishing a trust relationship; and
permitting access to the storage device by a relying party if the convincing evidence is altered by allowing the relying party to determine whether to access the storage device at the lower second trust level.

15. The method of claim 14 wherein the step of monitoring comprises:
identifying state changes or interface commands associated with possible state changes to the storage device or to files stored on the storage device.

16. The method of claim 14 wherein the state change comprise a change to one or more files on the storage device based on a revision to software code of the storage device, enablement of a debugging inspection to firmware of the storage device, or installation of new software on the storage device.

* * * * *